United States Patent
Rosen

[15] 3,703,641
[45] Nov. 21, 1972

[54] PARTICLE-SIZE MEASURING APPARATUS

[72] Inventor: Fred D. Rosen, La Habra Heights, Calif.

[73] Assignee: North American Rockwell Corporation

[22] Filed: Aug. 18, 1969

[21] Appl. No.: 850,725

[52] U.S. Cl. .................... 250/218, 250/237, 356/37, 356/102, 356/103
[51] Int. Cl. ...... G01n 1/00, G01n 15/02, G01n 21/00
[58] Field of Search ................. 356/36, 37, 102–104; 250/218, 237 R

[56] References Cited

UNITED STATES PATENTS

| | | | |
|---|---|---|---|
| 2,193,437 | 3/1940 | Summerson | 356/40 X |
| 3,037,421 | 6/1962 | Bigelow et al. | 356/37 |
| 3,060,747 | 10/1962 | Dunham | 356/37 |
| 3,361,030 | 1/1968 | Golbberg | 356/103 |
| 3,431,423 | 3/1969 | Keller | 250/218 |

Primary Examiner—Ronald L. Wibert
Assistant Examiner—Warren A. Sklar
Attorney—L. Lee Humphries, Charles F. Dischler and Sidney Magnes

[57] ABSTRACT

This invention causes a particle to pass through an intense lightbeam, thus producing a diffraction pattern that is converted to an output signal corresponding to the particle-size. A plurality of lenses produces a minimal-size lightbeam that is blocked-out for normal states, but is permitted to produce an output signal at the presence of a particle. The optical arrangement also blocks-out lightbeams produced by dust, thus providing a better signal-to-noise ratio indication.

5 Claims, 2 Drawing Figures

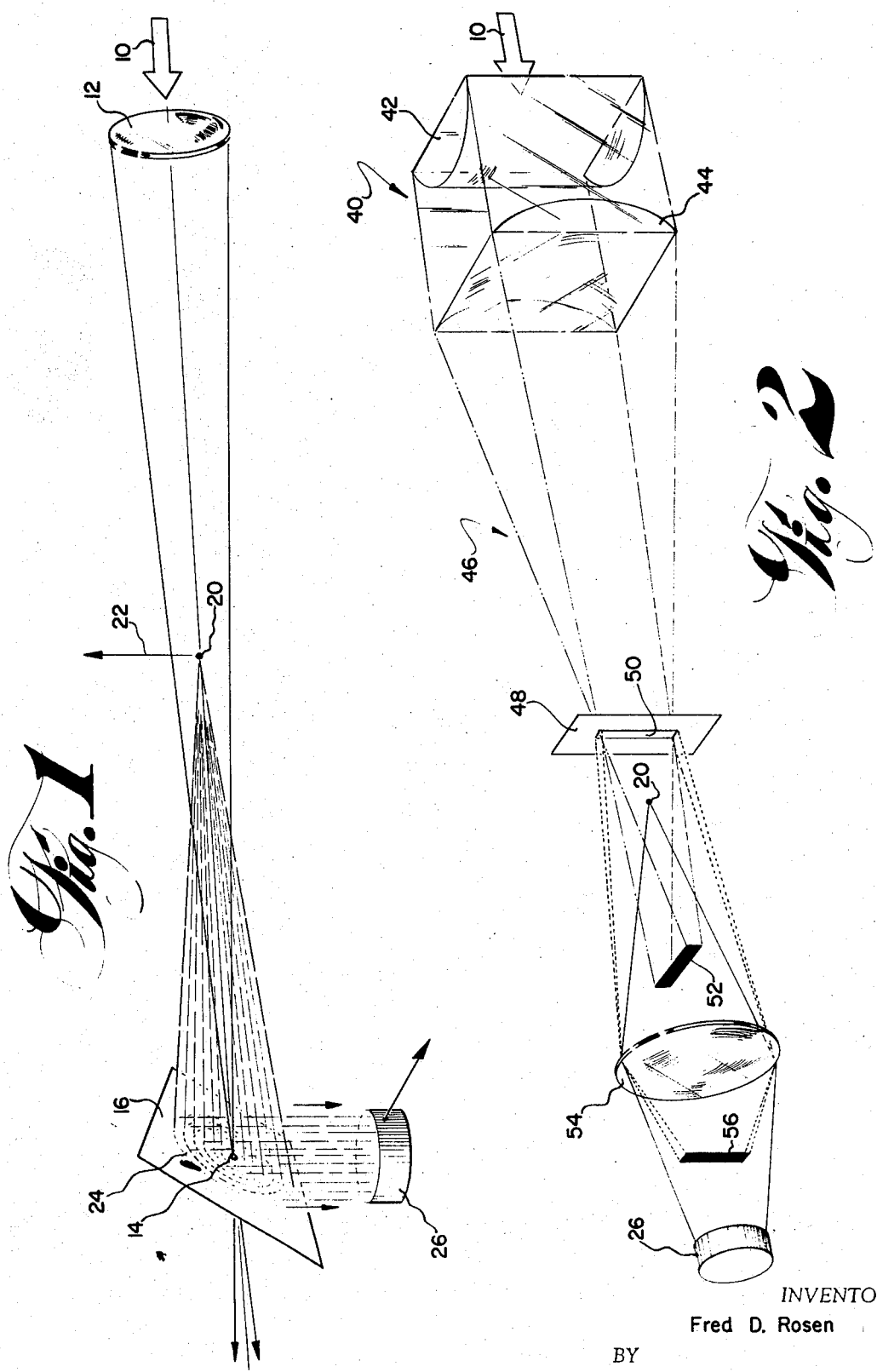

PARTICLE-SIZE MEASURING APPARATUS

BACKGROUND

It is frequently desirable to measure the particle-size of rapidly rapidly-moving particles; this situation arising in the analyzing of atmospheric particles, in the measuring of particles contained in the exhaust fumes of a factory, in measuring the particles in a solution, and the like.

A relatively new use for particle-size measurement arises in the desire to know more about micro-meteorites of the type that impinge upon, and may damage, a space vehicle. This type of impingement is being studied in laboratories by exposing targets to minute particles that are moving at extremely high velocities; and then analyzing the damage produced by the impact. Since it is practically impossible to obtain absolutely uniformly-sizes particles traveling at very high velocities; it becomes necessary to correlate the impact-damage with the size of the particle causing it; and several approaches have been used for particle-size measurement. Unfortunately, most of the well known techniques (such as high-speed photography) are not feasible — due to the small particle-size and simultaneous high particle-velocity.

A relatively new approach has been to cause the particles to pass across a lightbeam; since during its passage through the lightbeam the particle "diffracts" light away from the light's normal trajectory — so that a somewhat different light-pattern is produced. This light-pattern may then be compared with the light-pattern produced by particles of known sizes; or, alternatively, the amount of light in the "diffraction-pattern" may be measured. It has been found that there is extremely close correlation between the size of the particle and the amount of light in the diffraction-pattern; and this will be discussed later in more detail.

OBJECTS AND DRAWINGS

It is therefore the principal object of this invention to provide an improved apparatus for measuring particle-size. The attainment of this object and others will be realized from the following detailed description, taken in conjunction with the drawings, of which FIG. 1 illustrates a prior-art approach; and
FIG. 2 illustrates the basic inventive concept.

Referring first to FIG. 1, it will be noted that this portrays a light-beam 10 that passes through an optical-system 12; so that the primary light-beam is focused onto a focal-point 14. Point 14 may be a darkened spot that absorbs the impinging light; or else it may be, as shown, an aperture in a reflective mirror 16. Thus the primarily lightbeam is either absorbed at, or transmitted through mirror — so that it has no effect.

In operation, a particle 20 is directed through the primary lightbeam, in a direction such as indicated by arrow 22. while particle 20 is in the light-beam, it affects the impinging light in such a way as to produce a diffraction-pattern 24 that — in this case — takes the form of a plurality of rings that appear on mirror 16. Diffraction-patterns are well known, and are discussed in many books on optics. Basically, diffraction-pattern 24 is produced as follows. When the light impinges upon the periphery of particle 20, the lightbeam is bent slightly (diffracted); and the various secondary diffracted lightbeams now follow different paths to mirror 16. The various secondary light-paths are such that at some places they reinforce each other to produce bright areas, while at other places they nullify each other to produce dark areas. These light-and-dark areas coact to produce a diffraction-pattern, which — in this particular case — takes the form of rings positioned concentrically with focal-point 14.

The diffraction-effect is most pronounced with small particles — these tending to produce large, widely-spaced, relatively-faint circles; the larger particles tending to produce small, numerous, closely-spaced, relatively-bright circles. In fact, an extremely large particle has such a minor diffraction effect that its "circles" tend to impinge upon focal-point 14.

As shown in FIG. 1, the secondary lightbeams from particle 20 produce a diffraction-pattern 24; and the light from the diffraction-pattern 24 is reflected by mirror 16 into an optical-sensor 26. Thus, if there is no particle present, no light impinges onto sensor 26; and there is no output signal. However, the presence of a particle produces a diffraction-pattern, and thus an output signal; and, in accordance with the above discussion, a larger particle produces a larger output-signal from optical-sensor 26 than does a small particle. The instrument is therefore calibrated by using particles of known sizes, so that in tests the output-signal is readily correlated with particle-size.

To summarize the operation to this point, it will be recalled that if there is no particle in the light-beam, the primary lightbeam is focused at focal-point 14, from where it either passes through the mirror, or is absorbed. When — however — a particle 20 is in the lightbeam, the resultant secondary lightbeams produce a diffraction-pattern that is reflected by mirror 16 to impinge upon an optical-sensor 26 (such as a photomultiplier tube) that produces an output signal. In this way, the output signal from optical-sensor 26 is correlated with the size of the particle 20 positioned in the lightbeam at that particular instant.

Devices of the type shown in FIG. 1 contain an inherent disadvantage, which will be understood from the following discussion. Since the particles to be measured are quite small (e.g. 50 microns) and are moving very rapidly (e.g. 15 km/sec) the optical-sensor and associated electronic circuitry must be such as to provide a large amplification. Moreover, since the particle is moving very rapidly, the associated circuitry must be such as to have a high frequency and a large frequency-range. Furthermore, since the particle may be followed in very rapid succession by one or more differently-sized particles, the electronic circuitry associated with the optical sensor must have a fast response. All of these requirements, and others, make the system very susceptible to "noise," which shows up as a fairly-large constant signal against which it is necessary to distinguish a small transient signal produced by the moving particle.

It has been discovered that much of this noise-signal is caused ky dust that settles onto the optical-system 12. Their effect will be understood from the following discussion.

Referring again to FIG. 1, it will be noted that focal-point 14 takes care of all of the light in the primary lightbeam; since the incoming light-beam 10 is focused by optical-system 12 onto focal-point 14. However, a particle of dust on the optical-system 12 produces minute tertiary light-beams that are not focused in the above-described matter; but rather impinge upon different portions of mirror 16, and are then reflected to the optical-sensor 26 — which there-upon produces corresponding, spurious, output signals. This is the noise-signal that is desired to eliminate. Continual cleaning of the optical-system is necessary to minimize the noise-signal.

FIG. 2 shows the inventive concept for minimizing the noise-signal, and producing a more meaningful output-signal that may be correlated with the particle-size. In a manner similar to that discussed previously, incoming lightbeam 10 impinges upon a proximally-positioned optical-system 40 that, in this case, comprises a vertically-positioned cylindrical-lens 42 and a horizontally-positioned cylindrical-lens 44 — although, if desired, one of the cylindrical-lenses may be replaced by a spherical lens. The operation of composite optical-system 40 is such that the emerging lightbeam 46 converges in a horizontal direction due to the action of cylindrical-lens 42, and converges in a vertical direction due to the action of cylindrical-lens 44.

A plate 48, having a light-transmitting aperture (shown as a rectangular slit 50) is positioned in the path of lightbeam 46, and parallel to the longitudinal axis of first cylindrical-lens 42.

The first cylindrical-lens 42 is selected to have an effective focal-length substantially equal to the lens/slit distance. As a result of light-beam-component converges horizontally (in a first direction that is transverse to the direction of light propagation) and comes to a line-focus in the plane of plate 48, diverging after passage through slit 50.

The second cylindrical-lens 44 is positioned with its longitudinal axis transverse to that of the first lens 42, and is selected to have an effective focal-length that is substantially longer than its lens/slit distance. Thus, it causes the emerging lightbeam-component to converge vertically (transverse to the direction of light-propagation, and substantially perpendicular to the first direction) as the light approaches slit 50, and continue to converge to a line-focus in an image plane on the distal side of plate 48.

The lightbeam emerging from slit 50 is defined as the "primary" light-beam, and changes its cross-section from a vertical rectangle at slit 50 to a horizontal rectangle at the given image plane.

In order to block-out the normal primary lightbeam, a substantially-rectangular light-trap 52 is positioned horizontally in the given image-plane; plane; because at this location the size of the primary lightbeam is minimal, and therefore the size of the light-trap 52 is also minimal.

Thus, in a manner similar to that previously discussed — in the absence of a particle, the primary lightbeam is absorbed by a minimal-sized horizontal light-trap 52.

When particle 20 is introduced into the apparatus of FIG. 2, it produces a diffraction-effect as discussed previously; and the secondary lightbeams that are diffracted from particle 20 — rather than impinging upon a mirror — are imaged by a distally-positioned spherical lens 54 onto optical-sensor 26. In this way, the particle produces secondary lightbeams that cause the optical-sensor to produce an output-signal corresponding to the size of the particle. It should be noted that the minimal size of light-trap 52 provides an optimum output-signal from the optical-sensor 26.

It will be recalled that the noise-signal previously discussed was caused primarily by dust on the lenses, and the arrangement of FIG. 2 minimizes this effect as follows. The tertiary lightbeams from this dust traverse slit 50 at angles that are different from those shown; and spherical lens 54 uses the slit 50 as an "object" at a given object-distance, and images the slit 50 (and the odd-angled tertiary lightbeams passing therethrough) onto a vertical light-trap 56 that is positioned at a corresponding image-distance. Here too, the narrow slit 50 minimizes the size of light-trap 56; and thus optimizes the output-signal. In this way, the effect of the dust is obviated by lens 54 and light-trap 56.

To summarize the operation, the normal primary lightbeam is trapped by the horizontal light-trap 52; the tertiary lightbeams caused by dust are trapped by vertical light-trap 56; and only the secondary diffracted lightbeams reach the optical-sensor. In this way, the disclosed apparatus provides an improved signal-to-noise ratio by minimizing the effect of the primary and tertiary lightbeams.

If desired the rectangular slit and light-traps, and the cylindrical lenses may be replaced by a circular aperture, circular light-traps, and a spherical lens; but this modification would require somewhat larger light-traps, and would result in a somewhat smaller output-signal.

What is claimed is:

1. The combination comprising:

a mask with light-transmitting elongated slit aperture, means for producing a lightbeam directed towards said mask along an optical axis, first and second crossed cylindrical lenses positioned on the proximal side of said slit aperture and on the optical axis, for converging said lightbeam in a first direction transverse to the direction of propagation of said lightbeam so that the lightbeam is focused substantially to a line on said slit aperture, and for converging said lightbeam in a second transverse direction substantially perpendicular to said first direction so that after passing through said slit aperture the lightbeam is converged at a first plane spaced from and on the distal side of said mask, the lightbeam emerging from said slit aperture being defined as a primary lightbeam, a first light-trap positioned on the optical axis at said first plane for absorbing said primary lightbeam, optical-sensor means, positioned on the optical axis on the distal side of said slit aperture and said first light-trap for producing an output-signal when a particle present in said primary lightbeam located between said mask and said first light-trap produces secondary lightbeams, a spherical lens positioned on the optical axis between said slit aperture and said optical sensor means, for imagining said slit aperture at a second plane on the distal side of said spherical lens, a second light-trap positioned on the optical axis at said second plane for absorbing tertiary lightbeams produced by dust and the like, and traversing said slit aperture.

2. The combination of claim 1 wherein said slit aperture has its longitudinal axis substantially parallel to the longitudinal axis of one of said cylindrical lenses, whereby said primary lightbeam has a rectangular cross-section.

3. The combination of claim 2 wherein said first light-trap is rectangular for absorbing said rectangular primary lightbeam.

4. The combination of claim 3 wherein said second light-trap is rectangular, and positioned in the image-plane corresponding to the object-plane established by said slit.

5. The combination comprising:
a mask having rectangular light-transmitting slit,
first means for producing a lightbeam which is directed along an optical axis,
first optical means positioned on the optical axis on the proximal side of said slit in way of said lightbeam for converging said lightbeam in a first direction transverse to the direction of propagation of said lightbeam, and for converging said lightbeam in a second transverse direction substantially perpendicular to said first direction,
said first optical means comprising a first cylindrical lens with its longitudinal axis parallel to said slit, and having a focal-length equal to the lens/slit distance whereby the convergence produced by said first lens causes said lightbeam to converge at said slit, and to emerge therefrom as a diverging lightbeam-component,
said first optical means also comprising a second cylindrical-lens with its longitudinal axis perpendicular to said slit, and having a focal-length longer than the lens/slit distance whereby the convergence produced by said second lens causes said lightbeam to converge toward said slit, and to emerge therefrom as a converging lightbeam-component that converges at a first given image plane distal from said slit,
whereby the lightbeam emerging from said slit defines a primary lightbeam that has a rectangular cross-section, and has a minimal size at said first image plane, where its longitudinal axis is substantially perpendicular to said slit,
means comprising a first substantially-rectangular light-trap positioned on the optical axis in said first image plane
for absorbing said rectangular primary light-beam,
whereby said primary lightbeam is normally absorbed,
OPTICAL-sensor means positioned on the optical axis on the distal side of said slit and said first substantially-rectangular light-trap for producing an output-signal when a particle present in said primary lightbeam between said slit and said first substantially rectangular light-trap and produces secondary lightbeams,
second optical means comprising a spherical lens positioned on the optical axis between said first substantially rectangular light-trap and said optical-sensor means, for imaging said slit on a second image plane disposed on the proximal side of said optical-sensor means,
means comprising a second substantially rectangular light-trap positioned on the optical axis on the distal side of said second optical means at said second image plane, and
whereby tertiary lightbeams produced by dust and the like are absorbed by said second light-trap, so not to impinge onto said sensor-means, and thus do not produce spurious output signals.

* * * * *